3,737,299
METHOD OF COMBATING NUT SEDGE

Loren W. Hedrich, Overland Park, Kans., assignor to Gulf Research & Development Company, Pittsburgh, Pa.
No Drawing. Filed May 17, 1971, Ser. No. 144,246
Int. Cl. A01n 9/22
U.S. Cl. 71—94         4 Claims

ABSTRACT OF THE DISCLOSURE

Nut sedge is combated with quaternary 4-phenylpyridinium halides, for example 1-methyl-4-phenylpyridinium chloride which is toxic to nut sedge and a very limited number of crops, particularly when used prior to emergence of the crop and subsequent to the emergence of nut sedge.

DESCRIPTION OF THE INVENTIONN

Nut sedge is one of the ten most troublesome weeds in field crops in the United States and is probably the most troublesome weed in agriculture in the world. Nut sedge is a perennial plant and reproduces by underground tubers or "nuts" as well as by seeding. In the case of purple nut sedge, rhizomes emerge from the tuber and grow underground. At the end of a rhizome a basal bulb forms just below the soil surface and gives rise to another plant. More rhizomes grow from the basal bulb. More basal bulbs form at the ends of these rhizomes and the cycle repeats. Tuber chains start forming after 10 weeks and long chains are present after 18 weeks. After 20 weeks a field that started with one tuber per square foot may have 83,000 plants, 114,000 bulbs and 260,000 tubers in a single acre.

Many of the tubers are dormant and do not germinate unless the tuber chain is broken by plowing or cultivating. Mechanical methods of weed control tend to assist nut sedge in multiplication and the underground tubers appear to assist nut sedge in resisting weed control chemicals. In general the common species of nut sedge resist all herbicides with the exception of some of the more active thiocarbamates, triazines and chlorophenoxyacetic types. In general the herbicides to which nut sedge is susceptible have rather broad spectrum selectivity so that it is difficult to control nut sedge chemically in the presence of more than 2 or 3 common field crops. Even with the best chemical weed control of nut sedge there is always the possibility that uninjured dormant tubers will be broken off during the next tilling of the soil, resulting in a resumption of nut sedge propagation. Even if this does not occur, a few wind-borne seeds in a field can quickly reestablish nut sedge. The most effective chemical weed control must be repeated each growing season because of the remarkable ability of this weed to re-establish itself. A weed control agent with selective toxicity to nut sedge but very little toxicity toward common field crops is obviously very desirable but is so far unavailable.

I have discovered that members of a small group of quaternary phenylpyridinium salts possess high toxicity to nut sedge but are relatively harmless to a number of common crops and turf, particularly if the nut sedge plants are sprayed at planting time and thereafter are not disturbed by mechanical cultivation. These compounds are particularly safe when used prior to emergence of most crop plants and when the standing nut sedge is killed, permitting the crop plants to reach a thick stand, the shade produced by the crop is effective in preventing the growth and development of additional nut sedge plants which germinate late in the season. Briefly, my method of combating nut sedge comprises applying to the locus of the nut sedge plants an effective amount of a 4-phenylpyridinium salt having the structural formula

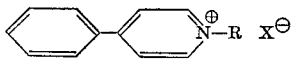

in which R is selected from alkyl and alkenyl substituents having from 1 to 4 carbon atoms and $X^{\ominus}$ is an ion selected from chloride, bromide and iodide or methylsulfate. The weed control agents of the method of this invention also are effective against a few other weeds, for example in certain instances wild buckwheat, wild oats or millet may also be effectively controlled. 1-methyl-4-phenylpyridinium halides are particularly useful and are preferred.

Neither 2-, 3-, or 4-phenylpyridine nor quaternary salts of 2- and 3-phenylpyridine possesses this unique activity.

Preparation of the weed control compounds

The active quaternary pyridinium compounds may be prepared from commercially available starting materials by the general methods illustrated in the specific procedures described below:

Preparation of 1-(3'-methylbutyl)-4-phenyl-pyridinium iodide

A solution of 4-phenylpyridine (4.7 g., 0.03 mol) and 3-methyl-1-iodobutane (5.9 g., 0.03 mol) in 50 ml. of dry dimethyl formamide was heated to 50° on an oil bath and stirred gently for 48 hr. The solution was poured into 250 ml. of anhydrous ether. The resulting yellow solid was isolated by filtration and washed with a small amount of acetone affording 8.1 g. (76%) of product, M.P. 190.5–191.5° (dec.).

*Analysis.*—Calcd. for $C_{16}H_{20}IN$ (percent): C, 54.50; H, 5.70; N, 3.96. Found (percent): C, 54.56; H, 5.64; N, 4.03.

Preparation of 1-methyl-4-phenylpyridinium chloride

A solution of methyl chloride (11.1 g., 0.22 mol) in 100 ml. of dry dimethyl formamide was prepared. A polytetrafluoroethylene-coated magnetic stirring bar and 4-phenylpyridine (31.1 g., 0.02 mol) were placed in a 125 ml. glass pressure vessel. The methyl chloride solution was added and the pressure vessel was sealed immediately. A homogeneous solution resulted, following a few minutes of stirring. The vessel was placed in an oil bath at room temperature. Over a period of 60–90 minutes the temperature was increased to 100° C. This temperature was maintained for 2 hr. The contents were allowed to cool to room temperature while the vessel remained in the oil bath and the stirring was continued. The vessel was opened after being chilled in an ice-water bath. The off-white crystalline solid was removed by filtration and washed with anhydrous ether. The yield of product was 36 g. (87%), M.P. 116.5–118.0°.

*Analysis.*—Calcd. for $C_{12}H_{12}ClN \cdot \frac{1}{2}H_2O$ (percent): C, 67.13; H, 6.10; N, 6.52. Found (percent): C, 67.00; H, 6.41; N, 6.67.

The compounds listed below have been made by procedures of the type illustrated above.

TABLE I

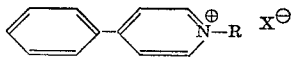

| No. | R | X | M.P., deg. |
|---|---|---|---|
| 1 | —CH₃ | I | 167.0–168.0 |
| 2 | —CH₃ | O—S(=O)(=O)—O—CH₃ | 162.0–163.5 |

TABLE I—Continued

| No. | R | X | M.P., deg. |
|---|---|---|---|
| 3 | —CH₃ | Cl | 116.5-118.0 |
| 4 | —C₂H₅ | I | 132.0-133.0 |
| 5 | —CH₂—CH=CH₂ | I | 130.0-131.0 |
| 6 | —CH₃ | Br | 120-142 |
| 7 | —CH₂—CH₂—CH(CH₃)CH₃ | I | 190.5-191.5 |
| 8 | —CH(CH₃)CH₃ | I | 106.0-107.5 |
| 9 | —CH₂—CH₂—CH₂—CH₃ | I | 163.5-165.0 |

Use of the active compounds in controlling nut sedge

Post-emergent use.—An aqueous dispersion of each active compound was prepared by combining 0.4 gram of the compound with about 4 ml. of a solvent-emulsifier mixture (3 parts of a commercial polyoxyethylated vegetable oil emulsifier, one part xylene, one part kerosene) and then adding water, with stirring, to a final volume of 40 ml.

The species of plants on which each compound was to be tested were planted in four-inch pots in a greenhouse. Ten to eighteen days after emergence of the plants, three pots of each species were sprayed with an aqueous dispersion of the active compound prepared as described above, at rates of 1 lb. and 3 lb. of active compound per acre and at a spray volume of 60 gallons per acre. Approximately one week after the spray application the plants were observed and the results rated according to the following schedule.

DEGREE OF EFFECT

0 = no effect
1 = slight effect (all plants recovered)
2 = moderate effect
3 = severe effect
4 = maximum effect (all plants died)

Results are summarized in the following table, indicating relative toxicity of the compounds to 24 species of plants.

Eighteen-day test of methyl 4-phenylpyridinium halides

In accordance with the observation that nut sedge plants die slowly after treatment with the herbicides, a longer period of time was allowed for a comparative test of the preferred methyl 4-phenylpyridinium halides at various application rates. The herbicides were used to spray well-established nut sedge plants growing in about 3 inches of soil in containers in the greenhouse. The spray mixtures were prepared by dispersing the active compounds in water with the aid of commercial solvents and surface active agents. The results were rated after 18 days according to the schedule set forth above and the plants were kept under observation for several more days to confirm the ratings. The results are summarized below.

TABLE III

[Post-emergent use of methyl 4-phenylpyridinium halides]

| Halide | Application rate (lb./A.) | Score after 18 days |
|---|---|---|
| I | 2 | 4 |
| Br | 2 | 4 |
| Cl | 2 | 4 |
| I | 1 | 4 |
| Br | 1 | 4 |
| Cl | 1 | 4 |
| I | ½ | 2 |
| Br | ½ | 3 |
| Cl | ½ | 3 |
| I | ¼ | 1 |
| Br | ¼ | 1 |
| Cl | ¼ | 1 |

In the same test, methyl 2-phenyl- and 3-phenyl-pyridinium iodide, as well as the corresponding free bases were also applied for purposes of comparison at 2 lb. per acre. There was no observable effect on the nut sedge.

In a greenhouse test of sensitivity of vegetable crops to methyl 4-phenylpyridinium iodide, allowing 5 weeks for any injury to become apparent, it was found that lettuce, garden peas, carrots and sweet corn were not affected to any significant degree, even at levels as high as 4 lb. per acre. Tomatoes exhibited only moderate effects at 4 lb. per acre, which is more than three times the application rate necessary to kill nut sedge under the same growing conditions.

I claim:
1. A method of combating nut sedge in crops and turf comprising applying to the locus of the nut sedge

TABLE II
Post-emergent use of 4-phenylpyridinium salts

| | Compound number | | | | | | | | | | | | | | |
|---|---|---|---|---|---|---|---|---|---|---|---|---|---|---|---|
| | 1 | | 2 | | 3 | | 4 | | 5 | | 6 | | 7 | | 9 | |
| Pounds/acre | 3 | 1 | 3 | 1 | 3 | 1 | 3 | 1 | 3 | 1 | 3 | 1 | 3 | 1 | 3 | 1 |
| Plant species: | | | | | | | | | | | | | | | | |
| Cocklebur | 0 | 0 | | | 1 | 0 | 0 | 0 | 0 | 0 | 0 | 0 | 0 | 0 | 0 | 0 |
| Lambsquarters | 1 | 0 | 2 | 0 | 1 | 0 | 1 | 0 | 1 | 0 | 0 | 0 | 0 | 0 | 0 | 0 |
| Morningglory | 0 | 0 | 1 | 0 | 1 | 0 | 1 | 0 | 1 | 0 | 0 | 0 | 2 | 1 | 0 | 0 |
| Pigweed | 0 | 0 | 0 | 0 | 1 | 0 | 1 | 0 | 0 | 0 | 0 | 0 | 0 | 0 | 0 | 0 |
| Wild buckwheat | 0 | 0 | 2 | 0 | 3 | 2 | 1 | 0 | 0 | 0 | 1 | 0 | 1 | 0 | 0 | 9 |
| Wild mustard | 0 | 0 | 2 | 0 | 1 | 0 | 1 | 1 | 0 | 0 | 1 | 0 | 2 | 1 | 1 | 0 |
| Barnyard grass | 0 | 0 | 1 | 1 | 2 | 0 | 1 | 1 | 0 | 0 | 1 | 0 | 0 | 0 | 0 | 0 |
| Crabgrass | 0 | 0 | 2 | 0 | 2 | 1 | 0 | 0 | 0 | 0 | 1 | 0 | 0 | 0 | 0 | 0 |
| Downy brome | 0 | 0 | 0 | 0 | 0 | 0 | 0 | 0 | 0 | 0 | 0 | 0 | 0 | 0 | 0 | 0 |
| Giant foxtail | 0 | 0 | 0 | 0 | 1 | 0 | 0 | 0 | 0 | 0 | 0 | 0 | 0 | 0 | 0 | 0 |
| Green foxtail | 2 | 0 | 1 | 0 | 2 | 0 | 1 | 0 | 0 | 0 | 2 | 1 | 0 | 0 | 0 | 0 |
| Nut sedge | 3 | 2 | 2 | 0 | 3 | 2 | 0 | 0 | 0 | 0 | 3 | 2 | 0 | 0 | 1 | 0 |
| Shattercane | 0 | 0 | 1 | 0 | 0 | 0 | 0 | 0 | 0 | 0 | 0 | 0 | 0 | 0 | 0 | 0 |
| Wild oats | 0 | 0 | 0 | 0 | 0 | 0 | 0 | 0 | 3 | 1 | 0 | 0 | 0 | 0 | 0 | 0 |
| Alfalfa | 1 | 0 | 0 | 0 | 1 | 0 | 1 | 0 | 0 | 0 | 0 | 0 | 0 | 0 | 0 | 0 |
| Cotton | 2 | 1 | 2 | 1 | 2 | 1 | 1 | 1 | 0 | 0 | 1 | 1 | 4 | 2 | 1 | 0 |
| Peanut | 1 | 0 | 0 | 0 | 0 | 0 | 0 | 0 | 0 | 0 | 0 | 0 | 0 | 0 | 0 | 0 |
| Soybean | 1 | 0 | 1 | 0 | 1 | 0 | 1 | 0 | 0 | 0 | 1 | 0 | 1 | 1 | 1 | 0 |
| Sugar beets | 1 | 0 | 1 | 0 | 1 | 1 | 2 | 1 | 0 | 0 | 1 | 0 | 1 | 0 | 1 | 0 |
| Tomato | 1 | 1 | 2 | 1 | 2 | 1 | 1 | 0 | 1 | 0 | 1 | 1 | 1 | 1 | 1 | 0 |
| Corn | 0 | 0 | 0 | 0 | 0 | 0 | 0 | 0 | 0 | 0 | 1 | 1 | 0 | 0 | 0 | 0 |
| Grain sorghum | 0 | 0 | 1 | 0 | 0 | 0 | 0 | 0 | 0 | 0 | 0 | 0 | 0 | 0 | 0 | 0 |
| Rice | 0 | 0 | 0 | 0 | 0 | 0 | 0 | 0 | 0 | 0 | 0 | 0 | 0 | 0 | 0 | 0 |
| Wheat | 0 | 0 | 0 | 0 | 0 | 0 | 0 | 0 | 0 | 0 | 0 | 0 | 0 | 0 | 0 | 0 | plants and effective amount of a quaternary 4-phenyl-pyridinium salt having the structural formula

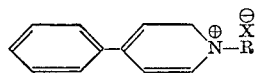

in which R is selected from alkyl and alkenyl substituents having from 1 to 4 carbon atoms and $X^\ominus$ is an ion selected from chloride, bromide, iodide and methylsulfate.

2. A method of combating nut sedge in crops and turf comprising applying to the locus of the nut sedge plants an effective amount of methyl 4-phenylpyridinium iodide.

3. A method of combating nut sedge in crops and turf comprising applying to the locus of the nut sedge plants an effective amount of methyl 4-phenylpyridinium bromide.

4. A method of combating nut sedge in crops and turf comprising applying to the locus of the nut sedge plants an effective amount of methyl 4-phenylpyridinium chloride.

References Cited

UNITED STATES PATENTS

| | | | |
|---|---|---|---|
| 3,575,985 | 4/1971 | Ritchie et al. | 260—290 |
| 2,847,414 | 8/1958 | Schmidle et al. | 260—290 |
| 3,069,253 | 12/1962 | Sousa | 71—94 |
| 2,734,815 | 2/1956 | Mowry et al. | 71—94 |

OTHER REFERENCES

Schlesinger et al., Chem. Abst. vol. 53, (1959), 15455b.

LEWIS GOTTS, Primary Examiner

C. L. MILLS, Assistant Examiner